United States Patent
Schreiber et al.

(10) Patent No.: US 8,827,654 B2
(45) Date of Patent: Sep. 9, 2014

(54) COMPRESSOR BLADE OF A GAS-TURBINE ENGINE WITH A SELF-SHARPENING LEADING-EDGE STRUCTURE

(75) Inventors: Karl Schreiber, Am Mellensee (DE); Werner Beck, Weyhe (DE)

(73) Assignees: Rolls-Royce Deutschland Ltd & Co KG (DE); Formtech GmbH (DE)

( * ) Notice: Subject to any disclaimer, the term of this patent is extended or adjusted under 35 U.S.C. 154(b) by 469 days.

(21) Appl. No.: 13/188,759

(22) Filed: Jul. 22, 2011

(65) Prior Publication Data
US 2012/0020802 A1 Jan. 26, 2012

(30) Foreign Application Priority Data
Jul. 23, 2010 (DE) .......................... 10 2010 032 097

(51) Int. Cl.
- *F01D 5/28* (2006.01)
- *F04D 29/32* (2006.01)
- *F04D 29/02* (2006.01)

(52) U.S. Cl.
CPC .............. *F01D 5/286* (2013.01); *F04D 29/324* (2013.01); *Y02T 50/673* (2013.01); *F04D 29/023* (2013.01); *Y02T 50/672* (2013.01); *F05D 2250/12* (2013.01)
USPC ..................... 416/224; 416/229 A; 416/229 R

(58) Field of Classification Search
USPC ........................... 416/224, 229 A, 229 R, 234
See application file for complete search history.

(56) References Cited

U.S. PATENT DOCUMENTS

| | | | |
|---|---|---|---|
| 3,275,295 A * | 9/1966 | Caldwell et al. | 416/224 |
| 4,130,380 A | 12/1978 | Kaiser | |
| 5,351,395 A * | 10/1994 | Crawmer et al. | 29/889.7 |
| 6,047,474 A * | 4/2000 | Millet et al. | 29/889.7 |
| 6,322,323 B1 * | 11/2001 | Komiyama et al. | 415/200 |
| 6,431,837 B1 | 8/2002 | Velicki | |
| 7,156,622 B2 | 1/2007 | Schreiber | |
| 7,744,346 B2 | 6/2010 | Schreiber et al. | |
| 7,896,221 B2 * | 3/2011 | Wallis | 228/194 |
| 2007/0140859 A1 * | 6/2007 | Schreiber et al. | 416/223 R |

FOREIGN PATENT DOCUMENTS

| DE | 10307610 | 9/2004 |
|---|---|---|
| DE | 102005061673 | 7/2007 |

OTHER PUBLICATIONS

German Search Report dated Mar. 25, 2011 from counterpart German patent application.

* cited by examiner

*Primary Examiner* — Ned Landrum
*Assistant Examiner* — Liam McDowell
(74) *Attorney, Agent, or Firm* — Timothy J. Klima; Shuttleworth & Ingersoll, PLC

(57) ABSTRACT

A compressor blade 1 of a gas-turbine engine has a flow-exposed leading edge 2. A component 3, made of wear-resistant material and featuring a higher erosive wear resistance than the base material, is attached to at least part of a length of the leading edge 2 The component 3 forming the flow-exposed leading edge 2 is strip-shaped, has an essentially rectangular cross-section and, with reference to a sectional plane perpendicular to the radial direction, is arranged only on an inflow side of the compressor blade profile in a partial area of a sectional surface of the inflow area.

20 Claims, 2 Drawing Sheets

Figure 1:
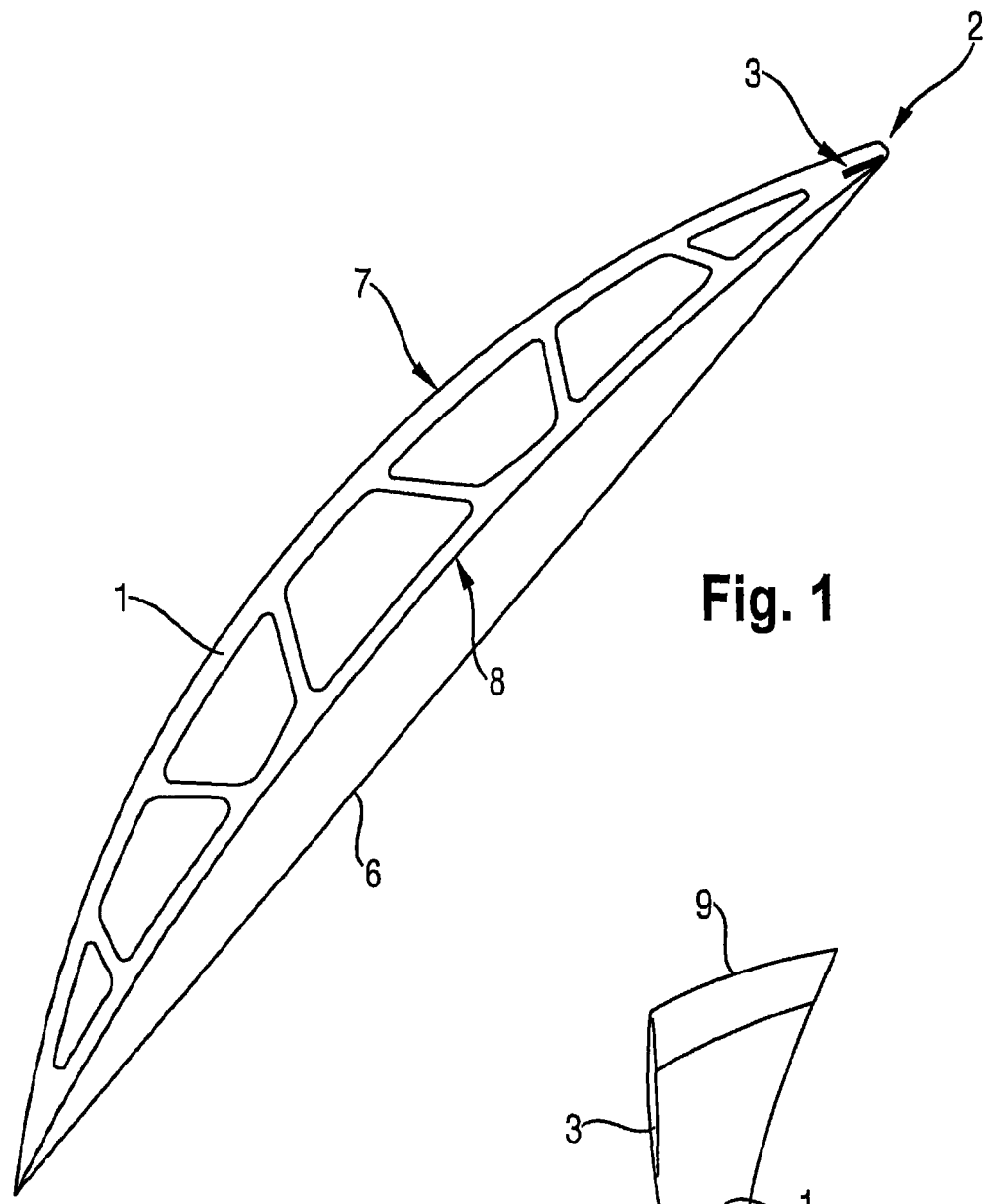

COMPRESSOR BLADE OF A GAS-TURBINE ENGINE WITH A SELF-SHARPENING LEADING-EDGE STRUCTURE

This application claims priority to German Patent Application DE102010032097.8 filed Jul. 23, 2010, the entirety of which is incorporated by reference herein.

This invention relates to a compressor blade of a gas-turbine engine with a flow-exposed leading edge to which a component made of wear-resistant material is attached.

Compressor blades are the foremost rotating components of a gas-turbine engine and subject to considerable loads by centrifugal forces, gas pressure and vibrations of the airfoil excited by the flow medium as well as, in particular, by ingested foreign objects and bird strike. Nevertheless, the blades shall have a supersonic profile with an inflow edge (leading edge) designed as thin and sharp as possible. Such a design disagrees, however, with the loading and damage situation which the leading edge may encounter by the impingement of foreign bodies.

Erosion and other damage caused by the impingement of foreign objects are particularly prevalent on the leading edge and the pressure side of the compressor blade. The provision of a robust compressor blade leading edge with a radius as large as possible to counteract foreign object damage in this area creates, however, a considerable aerodynamic loss and a reduction of engine performance arising therefrom.

In order to prevent further deterioration of a compressor blade leading edge damaged in service by foreign objects, all fan blades must, from time to time, be reground and reprofiled in the area of the leading edge. Such regrinding can, however, never be accomplished optimally, apart from the fact that regrinding and reprofiling of the damaged leading edge incur considerable work effort. This means that such grinding increases the profile of the leading edge and, in consequence, the aerodynamic loss. Moreover, the leading edge cannot be reground infinitely.

The compressor blades of a gas-turbine engine are additionally and significantly loaded by an impact resulting from the impingement of a bird on the fan blades. In this case, a small leading edge radius, i.e. a pointed, sharp form of the leading edge of the compressor blade is advantageous as such a sharp leading edge will cut the bird straight away, thus considerably reducing the impact on and the loading of the blade. However, a leading edge designed in consideration of this requirement conflicts with the risk of rapid damage by erosion, resulting in considerable maintenance effort and aerodynamic loss.

For the state of the art, reference is made to DE 10 2005 061 673 A1.

The present invention, in a broad aspect, provides a compressor blade of the type specified above which, while being simply designed and cost-effectively producible, avoids the disadvantages of the state of the art and is characterized by low wear and high efficiency.

In accordance with the present invention, a strip shaped component having an essentially rectangular cross-section is provided which forms the leading edge and is preferably made of a wear-resistant material, for example manganese hard steel or stellite. Besides the materials mentioned, the strip shaped component can also be made of titanium aluminides or other "hard" titanium alloys (at least harder than Ti6-4). A particular advantage here is the diffusion weldability with the titanium matrix of the blade and reduced distortion problems. A combination of the compressor blade and the strip shaped component in Ti/Ti with their approximately equal expansion values is less problematic than a combination Ti/steel with different heat expansion parameters. The strip shaped component is here inserted in the leading edge of the blade. Owing to the material of the component, the leading edge is thus provided with a high degree of wear resistance. Such a compressor blade, which for example can be designed as fan blade of a gas-turbine engine, is usually conceived as composite structure or titanium hollow structure or titanium solid structure. In the case of the composite structure, a titanium shell is applied to the carbon fiber structure or the carbon fiber core. Titanium is disadvantageous in that, because of the hazard of cracking, the blade cannot be provided with an inflow edge having a small radius and/or very sharp edges. Moreover, wear is encountered in service on the leading edge/inflow edge, for example due to erosion. Involved here are particles present in the air (dust, volcanic ash or similar), for example. Wear can also be due to the impingement of larger particles or objects, for example bird strike or items ingested. On a leading edge made of titanium, this results in an increase of the inflow radius. This entails a considerable decrease of efficiency of the compressor blade and, in turn, increased fuel consumption of the aircraft.

According to the present invention, it is particularly favorable to either arrange the component on the rim of the blade profile or to embed it in the blade profile. In both cases, a design is provided in which the actual inflow edge is formed by the component itself.

The strip shaped component with an essentially rectangular cross-section is, relative to its centerline, located in the longitudinal extension of the section, preferably arranged at an angle to the local inflow direction. This angle is preferably less than 45°. As the camber of the compressor blade can result in different inflow angles, also relative to the profile chord, it can be preferred to provide the strip shaped component with a spatial winding or curvature. However, the component may also be straight-lined. According to the present invention, it may also be favorable to provide the component only over part of the radial length of the compressor blade. When arranged at an angle to the local inflow direction, an angle less than 45° can be favorable. According to the present invention, the component can also be arranged at an angle to the profile chord of the blade, with an angle in a range up to 45° also being preferred in this case.

Since the component according to the present invention forms the inflow edge proper, it is favorable to provide the component with an aerodynamically shaped edge which preferably is rounded and preferably features a small radius, with the radius being 0.5 mm, for example. In conjunction with the material of the component, a very sharp leading edge is thus provided without involving the hazard of cracking of the material.

The component, which preferably is made of manganese hard steel or stellite, is preferably joined to the titanium material of the inflow edges of the blade structure, preferably diffusion welded or laminated or adhesively bonded. This can be accomplished either on both sides or only on one side relative to the respective longitudinal side of the rectangular cross-section of the component.

In accordance with the present invention, the compressor blade is provided as a fan blade or as compressor blade of a gas-turbine compressor.

The present invention is more fully described in light of the accompanying drawings showing preferred embodiments. In the drawings, FIG. 1 shows a sectional view of a compressor blade profile in schematic representation, FIG. 2 is an enlarged representation of different embodiments of the inflow area, FIG. 3 is a representation of a further exemplary embodiment, analogically to FIG. 2, and FIG. 4 is a simplified perspective representation of a compressor blade (fan blade) in accordance with the present invention.

Figure 2:
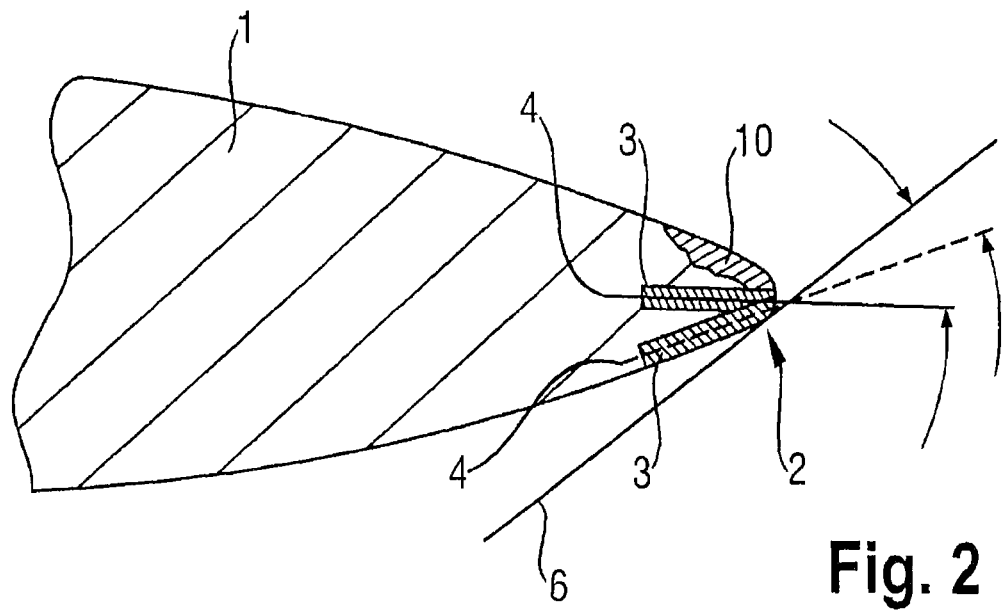
Figure 3:
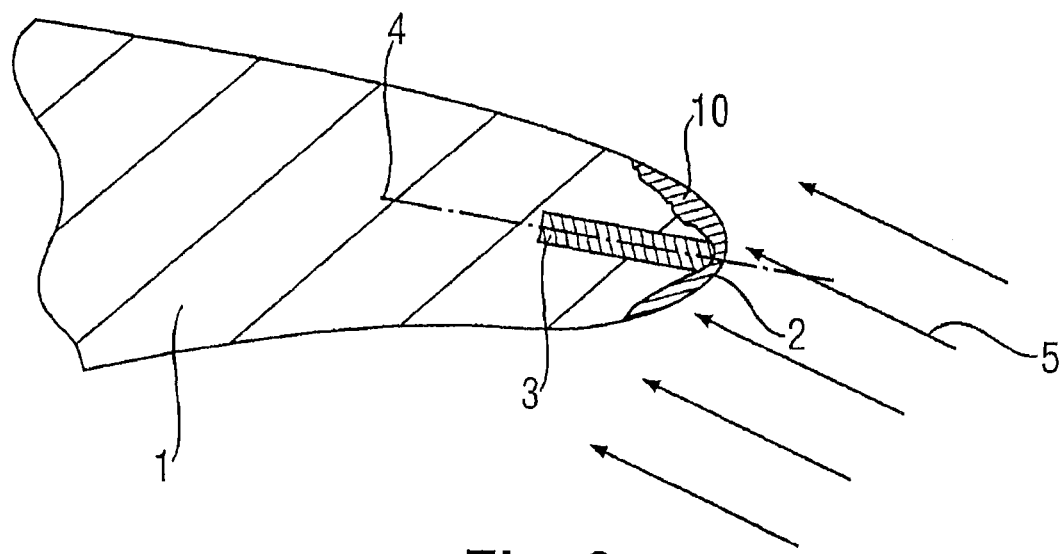

FIG. 1 shows a simplified sectional view of a blade 1 (such as a compressor or fan blade) with a profile chord 6 and a leading edge 2 arranged in an inflow area (see FIG. 3, in particular). A suction side of the compressor blade 1 is designated with reference numeral 7, a pressure side with reference numeral 8.

In an area of the leading edge 2, a strip shaped component 3 with an essentially rectangular cross-section is embedded, which is hereinafter described with reference to FIGS. 2 and 3.

Figure 4:
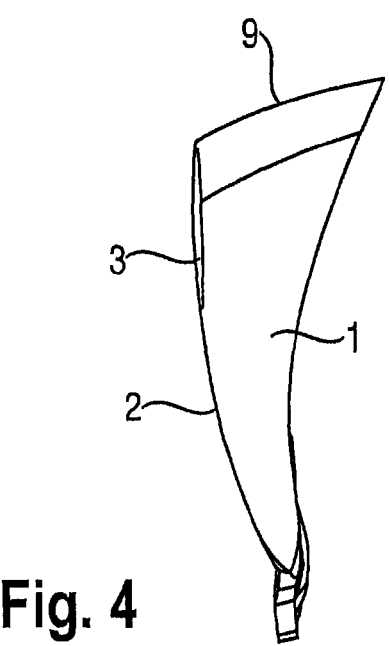

FIG. 4 shows a perspective, three-dimensional view of the compressor blade 1 according to the present invention, representing in particular a blade tip 9 and an area extending over part of the radial length in which the component 3 is arranged.

FIGS. 2 and 3 show enlarged sectional views of the area of the leading edge 2.

FIG. 2 shows two possible installation positions of the component 3. The component 3 can be attached on the side of the rim, as shown in the bottom half of FIG. 2. FIG. 2 shows the profile chord 6 and an installation angle of the component 3 having an essentially rectangular cross-section relative to the center axis 4 thereof. Accordingly, the angle to the profile chord can be 10°, for example.

FIG. 2 further shows a central arrangement of the component 3 in which the latter is connected on both sides to the structure of the compressor blade 1. This results in a larger angle between the center axis 4 and the profile chord 6, preferably less than 45°.

FIG. 2 illustrates that erosion (wear 10) will not affect the inflow area proper and the edge provided there, so that the profile remains "sharp". This is attributable to component 3 provided by the present invention which is made of a wear-resistant material, with wear 10 occurring only on the titanium material of the compressor blade 1.

FIG. 3 is a representation similar to FIG. 2, with the inflow direction of the air being additionally indicated by the arrows 5. Here again, wear 10 of the titanium material does not affect the edge of component 3, so that the edge will remain sharp. The component 3 can be provided with a slight rounding on the inflow side, for example in a radius range of 0.5 to 1.0 mm or in a radius range of 0.1 to 2 mm. The radius may also vary in the radial length of the blade to conform to the flow conditions.

Since the surrounding material on titanium basis is subject to higher erosive wear than the hard-metal strip, the leading edge is, in essence, "self-sharpening".

LIST OF REFERENCE NUMERALS

1 Compressor blade
3 Leading edge
3 Component
4 Center axis
5 Inflow direction
6 Profile chord
7 Suction side
8 Pressure side
9 Blade tip
10 Wear

What is claimed is:

1. A blade of a gas-turbine engine, comprising:
    a leading edge;
    a component attached along at least part of a length of the leading edge to form a flow-exposed portion of the leading edge, the component made of wear-resistant material having a higher erosive wear resistance than a base material of the leading edge, the component being strip shaped, having essentially rectangular cross-section and, with reference to a sectional plane perpendicular to a radial direction, is arranged only on an inflow side of a profile of the blade in a partial area of a sectional surface of an inflow area;
    wherein the component is embedded in a central portion of the leading edge and at least partially surrounded on both a pressure side and a suction side at the leading edge by the blade.

2. The blade of claim 1, wherein the component is arranged on a rim of the blade profile.

3. The blade of claim 2, wherein the component, relative to its centerline located in a longitudinal extension of the section, is arranged at an angle to a local inflow direction of less than 45°.

4. The blade of claim 3, wherein the component, relative to its centerline located in the longitudinal extension of the section, is arranged at an angle to a profile chord of the blade of, up to 45°.

5. The blade of claim 4, wherein, an inflow side of the component includes an aerodynamically shaped edge which is rounded and includes a radius ranging between 0.1 and 2 mm.

6. The blade of claim 5, wherein the component is made of at least one of manganese, hard steel, stellite, titanium aluminides and a titanium alloy harder than Ti 6-4.

7. The blade of claim 6, wherein the component is at least one of: joined to a material of an inflow edge structure of the blade by at least one of diffusion welding and lamination; and attached to the inflow edge structure on at least one of both sides and only on one side relative to a respective longitudinal side of the rectangular cross-section.

8. The blade of claim 7, wherein the blade is a compressor blade.

9. The blade of claim 7, wherein the blade includes two blade halves, separated approximately on a centerline, being diffusion joined together with the component.

10. The blade of claim 1, wherein the component is embedded in the blade profile.

11. The blade of claim 10, wherein the component, relative to its centerline located in a longitudinal extension of the section, is arranged at an angle to a local inflow direction of less than 45°.

12. The blade of claim 11, wherein the component, relative to its centerline located in the longitudinal extension of the section, is arranged at an angle to a profile chord of the blade of, up to 45°.

13. The blade of claim 12, wherein, an inflow side of the component includes an aerodynamically shaped edge which is rounded and includes a radius ranging between 0.1 and 2 mm.

14. The blade of claim 13, wherein the component is made of at least one of manganese, hard steel, stellite, titanium aluminides and a titanium alloy harder than Ti 6-4.

15. The compressor blade of claim 14, wherein the component is at least one of: joined to a material of an inflow edge structure of the blade by at least one of diffusion welding and lamination; and attached to the inflow edge structure on at least one of both sides and only on one side relative to a respective longitudinal side of the rectangular cross-section.

16. The blade of claim 15, wherein the blade is a compressor blade.

17. The blade of claim 15, wherein the blade is a fan blade.

18. The blade of claim 16, wherein the blade includes two blade halves, separated approximately on a centerline, being diffusion joined together with the component.

19. The blade of claim 1, wherein the blade includes two blade halves, separated approximately on a centerline, being diffusion joined together with the component.

20. The blade of claim 1, wherein erosion of the blade surrounding the component leaves the component forming at least a portion of the leading edge of the blade and maintaining a sharp profile of the blade.

\* \* \* \* \*